Figure 1:
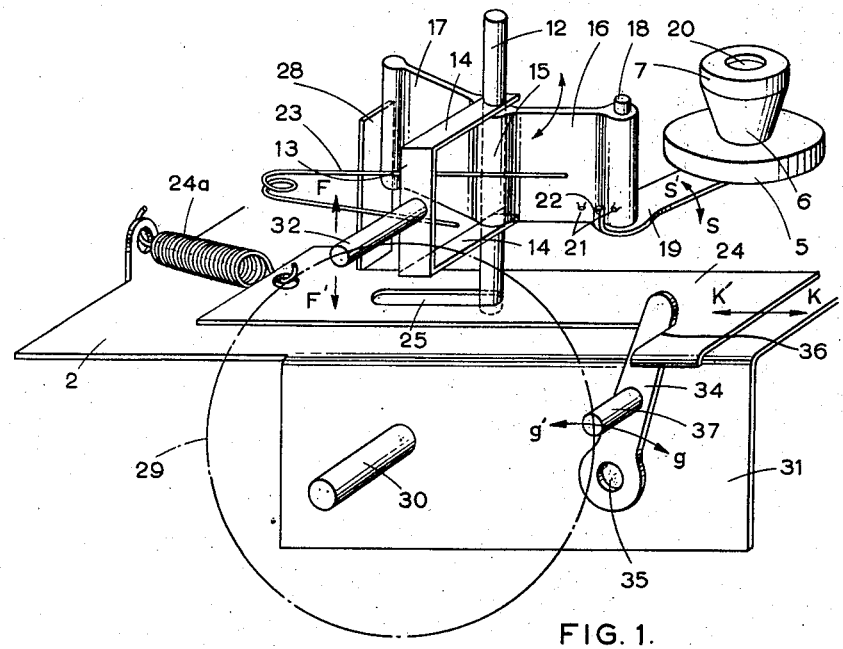

Sept. 29, 1959 J. MARINO 2,906,133
MULTI-SPEED DRIVE MECHANISMS
Filed March 31, 1958 3 Sheets-Sheet 1

Inventor
J. Marino
By Glascock Downing Seebold
Attys.

Sept. 29, 1959  J. MARINO  2,906,133
MULTI-SPEED DRIVE MECHANISMS
Filed March 31, 1958  3 Sheets-Sheet 2

Inventor
J. Marino
By Glascock Downing Seebold
Attys.

Sept. 29, 1959          J. MARINO          2,906,133
MULTI-SPEED DRIVE MECHANISMS Filed March 31, 1958                                3 Sheets-Sheet 3

Inventor
J. Marino
By Glascock Downing Leebold
Attys.

United States Patent Office 2,906,133
Patented Sept. 29, 1959

2,906,133
MULTI-SPEED DRIVE MECHANISMS

Jean Marino, Chatou, France, assignor to Les Industries Musicales et Electriques Pathe Marconi, Paris, France, a corporation of France Application March 31, 1958, Serial No. 725,142

Claims priority, application France April 19, 1957

11 Claims. (Cl. 74—190)

This invention relates to multi-speed drive mechanisms which are particularly, although not exclusively, applicable for use in gramophone record playing apparatus.

Multi-speed drive mechanisms employed in gramophone record playing apparatus usually comprise a motor the spindle of which supports a stepped driving wheel the steps of which are capable of being engaged selectively by a coupling wheel which engages the rim of the turntable of the apparatus and so drives said turntable at one of a number of desired speeds, for example 78, 45, 33⅓ and 16⅔ revolutions per minute. Usually such mechanisms, which include means for causing the coupling wheel selectively to engage the steps of the driving wheel, comprise an undesirably large number of mechanical components some of which are frequently delicate or expensive. In particular such mechanisms usually incorporate a number of cams which have to be very accurately designed and mounted and further constitute an undesirably large bulk beneath the turntable.

The object of the present invention is to provide an improved and simplified multi-speed drive mechanism and according to the present invention there is provided a multi-speed drive mechanism comprising a stepped driving wheel arranged to be driven, a coupling wheel adapted to be brought into driven engagement selectively with the steps of said driving wheel and with a driven element, whereby said element can be driven at a plurality of different speeds according to which step of said driving wheel is selected, and a single flat cam coupled to said coupling wheel, whereby displacement of said cam imparts displacement to said coupling wheel in directions substantially parallel to and perpendicular to the axis of said driving wheel.

It is arranged that normally said coupling wheel is held in driven engagement with said driving wheel and displacement of said cam imparts a displacement to said coupling wheel which is substantially perpendicular to the axis of said driving wheel so as to decouple said coupling wheel from said driving wheel, a displacement to said coupling wheel parallel to said axis to bring said coupling wheel into line with the selected step of the driving wheel and a displacement in the direction opposite to that of the first mentioned displacement to return said coupling wheel into driven engagement with said selected step. In a preferred embodiment of the invention the second mentioned displacement is commenced after commencement of the first mentioned displacement and is ceased prior to cessation of the third mentioned displacement said first and third mentioned displacements being effected successively.

Preferably the cam and means for coupling said cam to the coupling wheel are mounted on a common support with a motor driving said driven element, in an anti-vibratory manner relatively to said driven element. Moreover translation of said cam is conveniently arranged to be pivotal movement about an axis perpendicular to the axis of the driving wheel and said cam is arranged to co-operate with two pins, one of which determines the displacement of the coupling wheel in the direction parallel to the axis of the driving wheel and the other of which determines the displacement of the coupling wheel in a direction substantially perpendicular to said axis.

Figure 2:
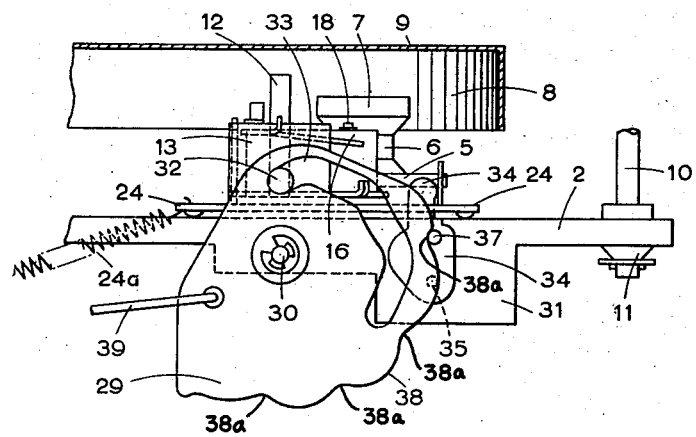
Figure 3:
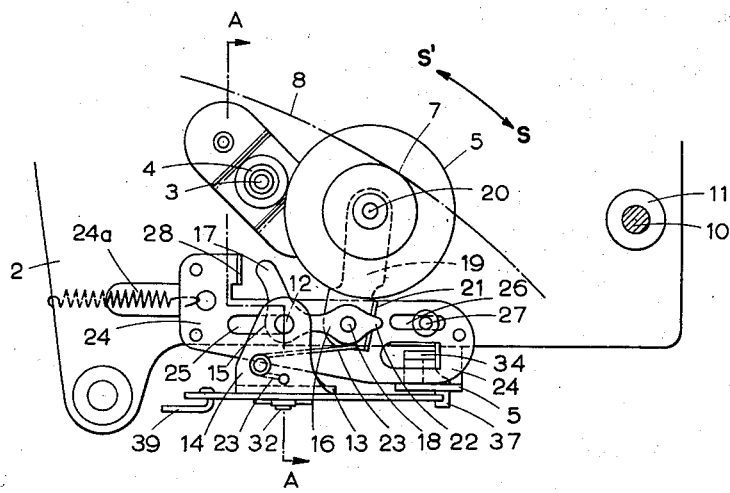
Figure 4:
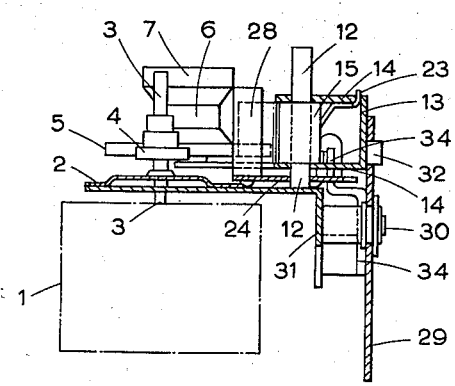
Figure 5:
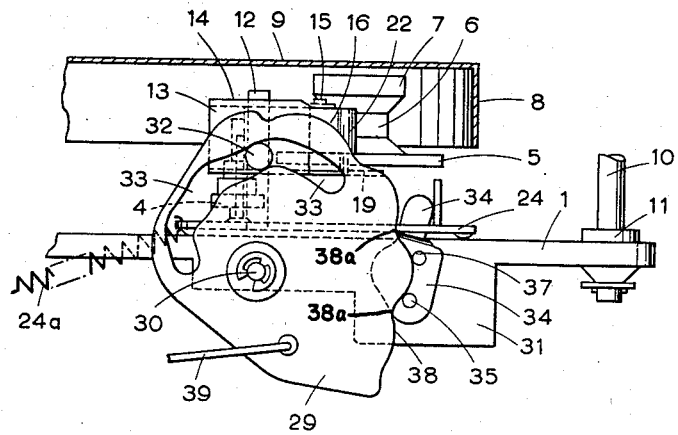
Figure 6:
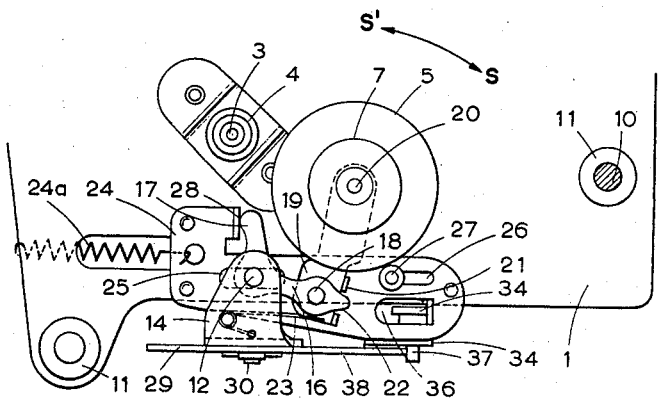

In order that the present invention may be clearly understood and readily carried into effect, it will now be more fully described with reference to the accompanying drawings, in which:

Figure 1 is a schematic perspective representation of a multi-speed drive mechanism in accordance with an embodiment of the invention, a part of said mechanism being removed, Figure 2 is a view in elevation of a practical embodiment of the invention, Figure 3 is a plan view of the mechanism of Figure 2, Figure 4 is a sectional view of the mechanism taken along the line AA of Figure 3, Figure 5 is a view in elevation of the mechanism when said mechanism is in the process of changing from one speed to another speed, and Figure 6 is a plan view of the mechanism in the position shown in Figure 5.

Referring to the drawings the invention is shown by way of example as applied to gramophone record playing apparatus. The multi-speed drive mechanism comprises a motor 1 mounted on a plate like support 2 said motor having a spindle 3 which supports a stepped driving wheel 4 comprising three steps. A peripheral surface 5 of a coupling wheel 6 is mounted so as to be capable of being brought into contact selectively with said three steps and the spindle 3 whilst at the same time a second peripheral surface 7 can be brought into contact with the rim 8 of the turntable 9 of the apparatus. The diameters of the three steps of the driving wheel 4 are so arranged that when coupled to the turntable 9 via the coupling wheel 6 they drive said turntable at 78, 45 and 33⅓ revolutions per minute respectively whilst said turntable 9 is driven at 16⅔ revolutions per minute when said coupling wheel is coupled to the spindle 3.

The turntable 9 is rotatably mounted on a spindle supported on a base plate (not shown) of the apparatus on which base plate is mounted the support 2 via an antivibratory coupling. The antivibratory coupling can conveniently comprise bolts 10 connecting said base plate to said support 2, flexible bearings 11 being disposed between said plate and support 2.

The coupling wheel 6 is caused selectively to engage the steps of the driving wheel 4 and the spindle 3 in the manner hereinafter referred to. As shown a shaft 12 is provided supported at one end by the support 2 and disposed with its axis parallel to the axis of said driving wheel 4. A plate 13 has two arms 14 projecting perpendicularly therefrom, said arms 14 being provided with apertures loosely accommodating the shaft 12 whereby said plate 13 and arms 14 are capable of movement axially relatively to said shaft 12. Also mounted on the shaft 12 between the arms 14 is a lever 15 having two arms 16 and 17 inclined at an angle to each other, said lever 15 being slidably mounted on the shaft 12 as shown. The width of the lever 15 is arranged substantially to equal the separation between the arms 14 of the plate 13 whereby said axial movement of said plate 13 causes corresponding axial movement of said lever 15. The end of the arm 16 remote from the shaft 12 supports therein a spindle 18 on which is mounted an arm 19 which carries a spindle 20 on which the coupling wheel 6 rotates. The spindle 18 is arranged to be pivotally supported with respect to the arm 16 of lever 15 so that the coupling wheel 6 is capable of pivotal movement about the axis of said spindle 18. The amplitude of said pivotal movement is controlled by the provision of projecting lugs 21 on the arm 16 against which a tongue 22 of the arm 19 abuts. Alternatively said lugs 21 may, as shown in Figures 3 and 6 be provided on the arm 19, the tongue 22 being provided at the end of the arm 16.

A return spring 23 is provided, said spring 23 having two arms one of which presses against the plate 13 and the other of which presses against the arm 16 of the lever 15. The effect of the spring 23, the arms of which are forced apart by the tension in said spring 23 is to tend to rotate the lever 15 in a counter-clockwise direction about the shaft 12 so that the peripheral surface 5 of the coupling wheel 6 is held in driven engagement with one of the steps of the driving wheel 4 or with the spindle 3.

On the support 2 and substantially parallel thereto is slidably mounted a plate 24 normally urged towards the left hand side of Figures 1, 2 and 3 by means of a tension spring 24a. The plate 24 is provided with a slot 25 to accommodate the shaft 12, a second slot 26, shown only in Figure 3, which accommodates a guide pin 27, and an arm 28 projecting substantially at right angles to the plate 24 in such a position as to be capable of abutting against the end of the arm 17 of the lever 15 remote from the shaft 12.

In order to control the means for selectively rotating the turntable 9 at different speeds described above there is provided a flat cam 29 which may be constructed by being stamped or cut out of sheet material. The cam 29 is pivotally mounted on a spindle 30 which is supported by a flange 31 of the support 2 whereby the spindle 30 is disposed substantially parallel to said support 2. The axis of the spindle 30 is therefore perpendicular to the axis of the shaft 12, and said axes are arranged to lie in a common plane. The plate 13 has mounted thereon a pin 32 arranged to engage in a cam slot 33 in said cam 29 such that rotation of said cam 29 causes vertical movement of said plate 13, adjacent surfaces of the plate 13 and cam 29 being arranged to be in sliding contact with each other. The axis of the pin 32 is arranged to lie in the same plane as the axes of the shaft 12 and spindle 30, and furthermore the direction of movement of the plate 24 is parallel to the plane of the cam 29.

The cam slot 33 follows a path eccentrically disposed with respect to the spindle 30 and comprising four portions which are preferably arranged to be convex relatively to the axis of the cam 29 as shown in Figures 2 and 5 in order to reduce friction between the pin 32 and the edges of said cam slot 33 as much as possible. The cam 29 is coupled to the slidable plate 24 by a coupling lever 34 pivotally mounted on a spindle 35 supported by the flange 31. The lever 34 engages a shoulder 36, as shown in Figure 1 or in a groove 36 as shown in Figure 6, of the slidable plate 24 and carries a pin 37 which abuts against the periphery 38 of the cam 29. Said periphery 38 of the cam 29 is arranged to be of undulating form, having in the present embodiment five indentations, the dells 38a of which are preferably equidistant from the axis of the cam 29 and which are suitably disposed relatively to the slot 33 for the purpose hereinafter described. The pin 37 is held in contact with the periphery 38 of the cam 29 by the action of the tension spring 24a on the slidable plate 24. A rod 39 is mounted eccentrically on the cam 29 and is employed to rotate said cam 29 to operate the mechanism described, by being provided with an actuating lever or a knob, for example.

In operation of the mechanism described when the cam 29 is rotated the pin 32 is caused by its engagement in the eccentric slot 33 to move in the directions indicated by the arrows FF' thereby moving the plate 13 and lever 15 vertically. Hence the coupling wheel 6 is moved vertically and so can be brought into line with a selected one of the steps of the driving wheel 4 or the spindle 3. Furthermore when said cam 29 is rotated the pin 37 moves in the directions gg' by reason of the undulating periphery 38 of said cam 29. When pin 37 moves in the direction g, the lever 34 engaging the shoulder 36 causes the plate 24 to move in the direction K against the tension in the springs 24a. When the pin 37 moves in the direction g' the pressure of the lever 34 on the shoulder 36 is released and the tension in the spring 24a therefore causes the plate 24 to move in the direction K'. When the plate 24 moves in the direction K the arm 28 abuts against the arm 17 of lever 15 and rotates said lever 15 in a clockwise direction thereby causing the coupling wheel 6 to be moved out of driven engagement with the driving wheel 4 on spindle 3, that is in the direction S. When the plate 24 moves in the direction K', however, the pressure of the arm 28 on the arm 17 is released and the tension in the spring 23 rotates the lever 15 in a counterclockwise direction to move the coupling wheel 6 into driven engagement with the driving wheel 4 or spindle 3, that is in the direction S'.

Commencing from the position shown in Figure 2, when the cam 29 is rotated in a counterclockwise direction the pin 37 is moved from the dell 38a in which it is shown in Figure 2 towards the next adjacent dell 38a so that initially said pin 37 and the lever 34 are moved in the direction g. This moves the slidable plate 24 in the direction K against the pressure of the spring 24a so that the arm 28 abuts against the arm 17 of lever 15 and rotates said lever in a clockwise direction. The arm 19 and coupling wheel 6 are consequently caused to pivot in the direction S so as to be moved out of contact with the stepped drive wheel 4. Whilst the pin 37 moves from one dell 38a to the adjacent dell 38a it is arranged that the pin 32 moves along one portion of the slot 33. Thus said pin 32 is caused to move in the direction F whereby the guard plate 13 and lever 15 are likewise moved in the direction F. Hence the coupling wheel 6 is moved upwardly in the vertical direction until it is aligned with the next adjacent step of the driving wheel 4. It is arranged that when said coupling wheel is so aligned the pin 37 approaches the next indentation of the periphery 38 so that said pin 37 and the lever 34 are moved in the direction g', the plate 24 is moved in the direction K' by the tension spring 24a and so the pressure of the arm 28 on the arm 17 is released. Hence the spring 23 causes the lever 15 to rotate in the anticlockwise direction, whereby the arm 19 pivots in the direction S', and the coupling wheel 6 is moved into engagement with the stepped driving wheel.

It will be understood that rotation of the cam 29 from the position in which pin 37 resides in one dell 38a of the periphery 38 to the next dell 38a causes the coupling wheel 6 to be pivoted first in the direction S and then in the direction S' whilst said coupling wheel 6 is moved vertically to be aligned with the next step of the driving wheel 4. Thus if the speed at which the turntable 9 is rotated is changed from the lowest speed, say, to the highest speed the change is made by causing the coupling wheel 6 to engage each step of the driving wheel 4 sequentially until the required step is engaged.

It is preferred that vertical movement of the coupling wheel 6 is not commenced until after said wheel has commenced to be rotated in the direction S and so is out of contact with the stepped driving wheel 4, and likewise vertical movement of said wheel 6 ceases before rotation in the direction S' ceases. Hence damage to the driving wheel 4 and/or to the coupling wheel 6 is substantially prevented. For this purpose the four portions of the slot 33 are terminated by arcuate portions having a common centre at the axis of the spindle 30, so that the pin 32 is located in such an arcuate portion when the pin 37 is located in a dell 38a of the periphery 38. Thus since whilst the pin 37 follows said arcuate portions said pin remains stationary, movement of the coupling wheel 6 in the direction S is commenced prior to the commencement of vertical movement of said wheel 6 and likewise said vertical movement ceases prior to cessation of the movement of said wheel 6 in the direction S'.

Figures 5 and 6 show the mechanism in a position in which the pin 37 engages a protuberance of the periphery 38.

It will be appreciated that variations in the design and nature of the mechanical components in the mechanism may be made whilst not departing from the essence of the invention. For example the periphery 38 of the cam 29 could be arranged to engage the shoulder or groove 36 directly without the provision of the intermediate lever 34 and pin 37.

What I claim is:

1. A multi-speed drive mechanism comprising a stepped driving wheel, a coupling wheel, a single flat cam angularly movable about an axis, and having first and second camming surfaces, a first coupling between said first camming surface and said coupling wheel whereby said coupling wheel is displaced in directions substantially parallel to the axis of said driving wheel when said cam is angularly moved about its axis, and a second coupling between said second camming surface and said coupling wheel whereby said coupling wheel is displaced in directions substantially perpendicular to the axis of said driving wheel when said cam is angularly moved about its axis, whereby said coupling wheel is brought selectively into driven engagement with the steps of said driving wheel.

2. Mechanism according to claim 1 wherein said first camming surface is formed by a slot in the surface of said cam, and said second camming surface is the periphery of said cam.

3. Mechanism according to claim 2 wherein said slot follows a path eccentrically disposed with respect to the axis of angular movement of said cam, and said slot comprises a plurality of portions corresponding in number to the number of steps of said driving wheel.

4. Mechanism according to claim 3 wherein said slot portions are terminated by arcuate portions having a common centre at the axis of said cam.

5. Mechanism according to claim 2 wherein said periphery of said cam is of undulating form.

6. Mechanism according to claim 1 comprising a fixed shaft, the axis of which is parallel to the axis of said driving wheel, and a lever carrying said coupling wheel and mounted for axial and pivotal movement relatively to said shaft.

7. Mechanism according to claim 6 comprising a member mounted for axial movement relatively to said shaft, a pin carried by said member and co-operating with said first camming surface, for imparting said axial movement to said lever.

8. Mechanism according to claim 7 in which the axis of said pin and the axis of said cam are parallel to each other and are perpendicular to the axis of said shaft and the three mentioned axes lie in a common plane.

9. Mechanism according to claim 6 comprising a slidably mounted plate spring urged in a first direction and having an arm for moving said lever pivotally in one direction relatively to said shaft when said plate slides in the reverse direction to said first direction, and a coupling between said slidably mounted plate and said second camming surface, and a spring urging said lever for pivotal movement in the reverse direction to said one direction relatively to said shaft.

10. Mechanism according to claim 9 comprising a coupling lever engaging said slidably mounted plate and a pin carried by said coupling lever and co-operating with said camming surface.

11. Mechanism according to claim 9 in which the spring urging said lever for pivotal movement in the reverse direction to said one direction relatively to said shaft tends to hold said coupling wheel in driven engagement with said driving wheel.

References Cited in the file of this patent

UNITED STATES PATENTS

| | | |
|---|---|---|
| 2,386,503 | Pressley | Oct. 9, 1945 |
| 2,438,265 | Metzner | Mar. 23, 1948 |
| 2,603,977 | Cain | July 22, 1952 |
| 2,655,812 | Morrison | Oct. 20, 1953 |
| 2,788,669 | Richards | Apr. 16, 1957 |
| 2,795,961 | Brown | June 18, 1957 |
| 2,801,546 | Scheller et al. | Aug. 6, 1957 |
| 2,826,926 | Singer | Mar. 18, 1958 |

OTHER REFERENCES

Product Engineering, January 1950, volume 21, issue No. 1.